United States Patent Office 3,057,878
Patented Oct. 9, 1962

3,057,878
PROCESS FOR MAKING CRYSTALLINE POTASSIUM SALT OF GIBBERELLIC ACID
Anthony F. De Rose, Waukegan, Ill., assignor to Abbott Laboratories, Chicago, Ill., a corporation of Illinois
No Drawing. Filed Mar. 9, 1959, Ser. No. 797,886
3 Claims. (Cl. 260—343.3)

The invention relates to an improved process for preparing the crystalline potassium salt of gibberellic acid.

Gibberellic acid and the potassium salt thereof are described in U.S. 2,842,051. The salt is useful as a growth promotant when applied to the foliage of plants, for example in aqueous solution.

It is an object of this invention to provide an improved method for preparing the crystalline potassium salt of gibberellic acid in good yields by a process which is readily adaptable to large scale production.

I have found that when an amorphous form of potassium salt of gibberellic acid, either in the crude form or in a substantially purified form, is rendered anhydrous, it can be dissolved in anhydrous ethanol, the solvent also being in the anhydrous state, to form a solution of the salt at a level within the range of 15–25% w./v. from which the potassium salt of gibberellic acid is obtained in good yields in crystalline form without effecting any environmental change. The rate of crystallization may be accelerated by chilling the solution, by scratching the sides of the containing vessel or by seeding the solution with crystals of potassium salt of gibberellic acid. As an alternative accelerating means, a lower alkyl ketone such as acetone or methyl isobutyl ketone can be added to the point at which turbidity appears.

The range of about a 15–25% w./v. solution of the amorphous salt in the inert organic solvent is critical. Below this concentration range, the salt remains in solution. If the concentration of said solution is increased above 25% a syrupy solution results from which crystals are not readily obtained.

The following examples are set forth solely for the purpose of illustrating the present invention.

*Example I*

Four hundred mg. of dry amorphous potassium salt of gibberellic acid is dissolved in 2 ml. of anhydrous ethanol. When the solution is allowed to stand, crystals of the potassium salt of gibberellic acid are formed. The resulting alcoholic solution is chilled to about 5° C. to accelerate the crystallization. The crystals are filtered off and dried. A yield of 170 mg. of crystalline potassium salt of gibberellic acid is obtained.

*Example II*

One gram of dry amorphous potassium salt of gibberellic acid is dissolved in 5 ml. of anhydrous ethanol. The resulting alcoholic mixture is allowed to stand at room temperature whereupon crystallization commences. The alcoholic mixture is subsequently chilled to about 5° C. and 850 mg. of crystalline potassium salt of gibberellic acid having a melting point of 223–225° C. is recovered. The yield of the potassium salt is 85%.

*Example III*

One hundred ml. of an aqueous concentrate of gibberellic acid having a potency of 53 mg./ml. is extracted at a pH of about 3.5 with 100 ml. of methyl isobutyl ketone. The extraction is repeated. The methyl isobutyl ketone extract is washed with water and neutralized with a solution of potassium hydroxide in anhydrous ethanol. The pH of the methyl isobutyl ketone extract is about 6.95. The methyl isobutyl ketone solution is treated with carbon in about a 2% w./v. amount and the carbon solution filtered in order to remove carbon as well as any undissolved material.

The filtrate is concentrated to a syrup to remove the methyl isobutyl ketone and any residual water. The syrup is dissolved in 10 ml. of anhydrous ethyl alcohol and seeded with a few grains of crystalline potassium salt of gibberellic acid to promote crystallization. The crystallization is completed in about an 18 hour period by allowing the seeded mixture to stand in cold at 5° C. The crystals are recovered by filtration and washed with 10 ml. of 75% ethanol and 25% benzene and dried in vacuum giving a yield of 4.1 grams of crystalline potassium salt of gibberellic acid which is a 77.5% yield.

*Example IV*

An alcoholic solution, not necessarily anhydrous, containing 1 gram of gibberellic acid is treated with an equivalent of potassium hydroxide dissolved in 6 ml. of anhydrous ethanol, resulting in a clear solution. To the solution is added 12 volumes of methyl isobutyl ketone which precipitates the potassium salt of gibberellic acid. The precipitate is collected by centrifugation and subsequently dried. The dried amorphous potassium salt of gibberellic acid is dissolved in 5 ml. of anhydrous ethyl alcohol. The vessel containing the alcoholic solution of the potassium salt of gibberellic acid is scratched in order to accelerate crystallization. Three hundred and fifty mg. of the crystalline potassium gibberellic acid is recovered by filtration resulting in a 35% yield.

Others may readily adapt the invention for use under various conditions of service, employing one or more of the novel features disclosed or equivalents thereof.

I claim:

1. A process for preparing highly purified crystalline potassium salt of gibberellic acid comprising the addition of anhydrous ethanol to dry amorphous potassium salt of gibberellic acid in an amount to form a solution having about a 15–25% w./v. concentration and precipitating said potassium salt of gibberellic acid from the solution as a crystalline product said process characterized by the absence of water during the precipitation step.

2. A process for preparing highly purified crystalline potassium salt of gibberellic acid comprising the addition of anhydrous ethanol to dry amorphous potassium salt of gibberellic acid in an amount to form a solution having about a 20% w./v. concentration and precipitating said potassium salt of gibberellic acid from the solution as a crystalline product said process characterized by the absence of water during the precipitation step.

3. A process for preparing highly purified crystalline potassium salt of gibberellic acid from an aqueous concentrate of gibberellic acid, comprising extracting the gibberellic acid from the aqueous concentrate with a lower alkyl ketone, washing the ketone extract with water, neutralizing the washed extract with a solution of potassium hydroxide in anhydrous ethanol until the pH of the alcohol solution is about 6.95, treating the neutralized solution with active carbon, filtering the solution, removing the ketone and water from the solution, dissolving the residue in anhydrous ethanol to form a solution having a concentration of potassium salt of gibberellic acid in the range of about 15–25% w./v., and precipitating crystalline potassium salt of gibberellic acid from the solution, said process characterized by the absence of water during the precipitation step.

References Cited in the file of this patent

UNITED STATES PATENTS

| | | |
|---|---|---|
| 2,520,099 | Hodge | Aug. 22, 1950 |
| 2,842,051 | Brian et al. | July 8, 1958 |
| 2,980,700 | Probst | Apr. 18, 1961 |

OTHER REFERENCES

In re Weijlard et al., 587 O.G. 3, March 4, 1946.